United States Patent Office 3,049,802
Patented Aug. 21, 1962

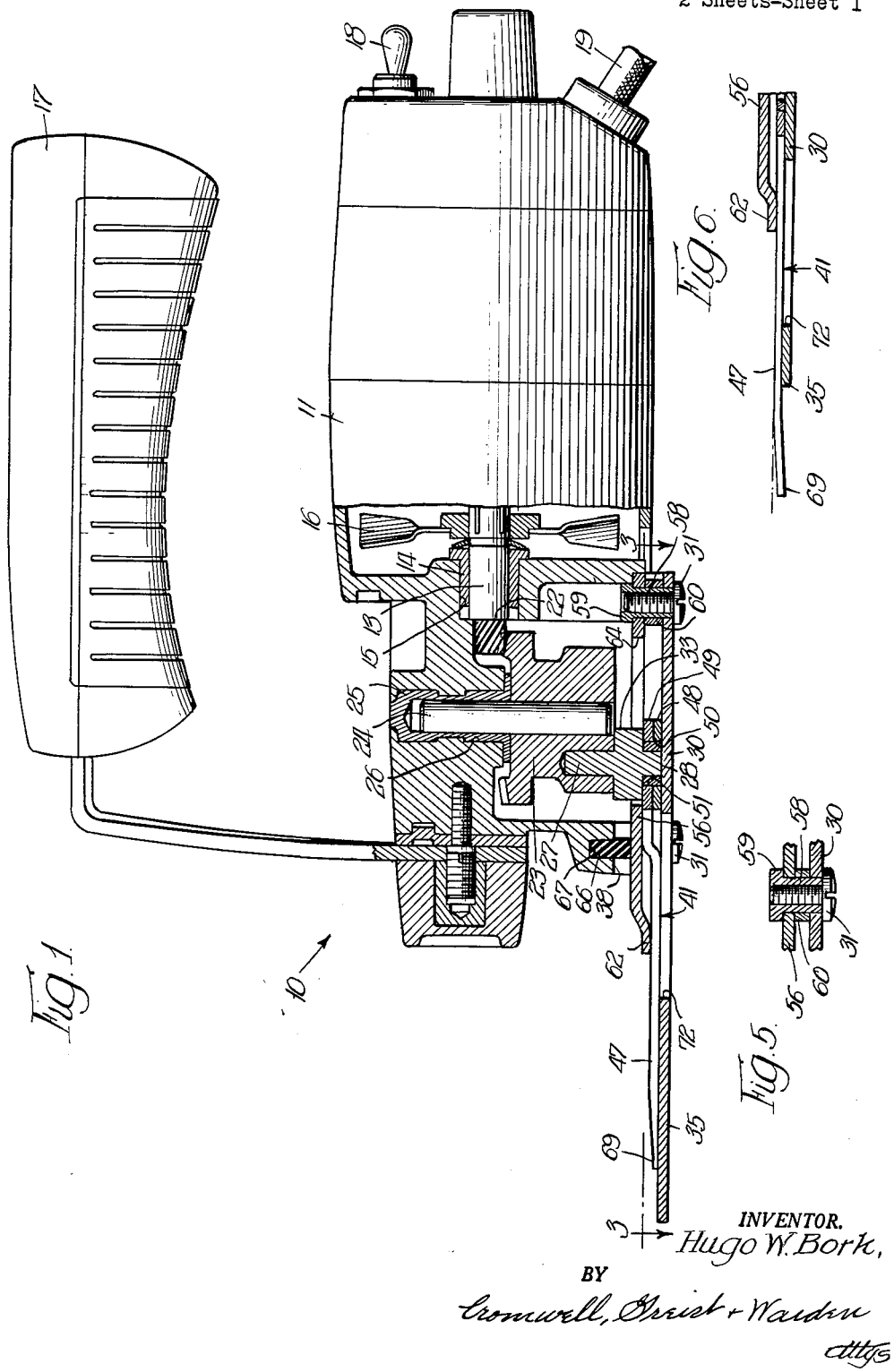

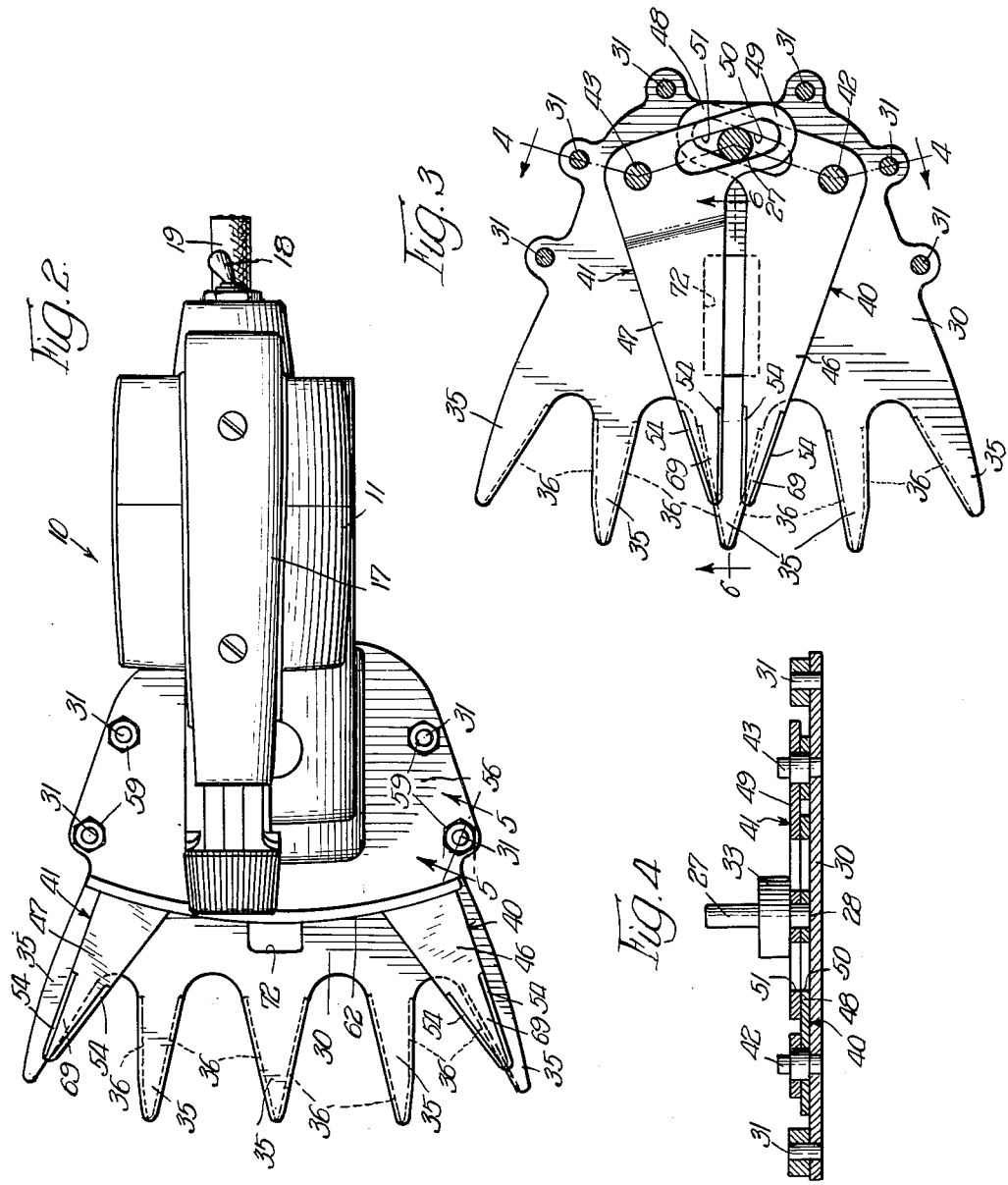

3,049,802
SHRUB AND GARDEN SHEAR
Hugo W. Bork, Chicago, Ill., assignor to Skil Corporation, Chicago, Ill., a corporation of Delaware
Filed Nov. 25, 1960, Ser. No. 71,540
7 Claims. (Cl. 30—197)

The present invention relates to shrub and garden shears and, particularly, to shears of the type having a fixed or stationary blade member including a series of projecting finger-like teeth members and a pair of generally pointed cutting blades overlying the stationary teeth members which oscillate toward and away from each other whereby to provide a shear-like cutting action.

The general object of the present invention is to provide a new and improved shrub and grass shear which is self-cleaning and which has an improved shear-like cutting action.

An important object of the invention is to provide a new and improved shrub and grass shear of the character described wherein the oscillating cutter blades are retained in shearing engagement with the stationary teeth by a pressure plate and wherein the tips of the oscillating cutter blades are provided with a slight deflection downwardly toward the stationary teeth whereby to improve the shearing action and render the shear self-sharpening.

Another important obect of the invention is to provide a new and improved shrub and grass shear of the character described wherein the fixed blade member is provided with an opening through which the material cut may fall whereby to render the shear self-cleaning, the opening being located approximately midway between the reciprocal cutter blades whereby these blades during their movement toward each other tend to sweep the material cut toward the self-cleaning opening.

Certain other objects of the invention will, in part, be obvious, and will in part appear hereinafter.

For a more complete understanding of the nature and scope of the invention reference may now be had to the accompanying drawings wherein:

FIG. 1 is a side elevational view, partially in vertical section, of a shrub and grass shear embodying the invention;

FIG. 2 is a top plan view, on reduced scale, of the shear shown in FIG. 1 with the oscillating blades being shown in their outermost positions;

FIG. 3 is a horizontal section, on reduced scale, taken generally on the line 3—3 of FIG. 1 with the oscillating cutter blades being shown in their innermost positions;

FIG. 4 is an enlarged vertical section taken generally on the line 4—4 of FIG. 3;

FIG. 5 is an enlarged vertical section taken generally on the line 5—5 of FIG. 2; and FIG. 6 is an enlarged vertical section taken generally on the line 6—6 of FIG. 3 with the outermost portion of the fixed finger-like tooth member on the fixed blade member being broken away.

As illustrated in the drawings, a hand-operable electric shrub and garden shear 10 embodying the invention includes a housing 11 in which is mounted a conventional electric motor (not shown) having a drive shaft 13 one end of which is rotatably mounted in a bearing sleeve 14 which is supported in an internal bore 15 formed in the housing 11. A conventional fan blade 16 is mounted on the motor drive shaft 13. The shear 10 is provided with a suitable handle 17 which is located above the housing 11 and the electric motor is provided with a conventional "on-and-off" switch 18 and a power cord 19.

The forward end of the motor drive shaft 13 is provided with a spiroid worm-type gear 22 which is disposed in meshed driving engagement with a mating spiroid bevel-type gear 23. The gear 23 is mounted on a vertically disposed stub shaft 24 which is rotatably received in a bearing sleeve 25 secured in an aperture 26 in the housing 11. A drive pin 27 projects downwardly from the lower end of the bevel gear 23 and is disposed eccentrically relative to the axis of rotation thereof. The lower end 28 of the drive pin 27 is supported on a fixed or stationary blade member 30 which projects forwardly from the housing 11 and is secured to the underside thereof by a series of threaded fasteners 31. The drive pin 27 is provided intermediate its upper and lower ends with an enlarged diameter portion 33 upon which the bevel gear 23 is supported.

The fixed or stationary blade member 30 is provided with a series of spaced apart, forwardly projecting finger-like teeth 35 having the side edges thereof sharpened, as at 36. The front wall of the housing 11 terminates above the fixed blade 30 whereby to define a transversely extending opening 38 (FIG. 1) in the front of the shear 10, which opening 38 extends across the full width of the front of the shear 10.

A pair of movable cutters are provided in the form of a pair of bell crank members 40 and 41, as best illustrated in FIG. 3. The bell crank members 40 and 41, which are preferably formed of spring steel, are each pivotally mounted at the corners thereof defined by the intersection of their two arm portions on the rear portion of the fixed blade member 30 and at opposite sides thereof with the bell crank member 40 being pivotally mounted on a pin 42 and the bell crank member 41 being pivotally mounted on a pin 43. One arm portion of each of the bell crank members 40 and 41 extends generally forwardly in overlying sliding engagement with the finger-like teeth members 35 of the stationary blade member 30 with such arm portions being generally pointed whereby to define a pair of cutter blades 46 and 47 on the bell crank members 40 and 41, respectively. The other arm portions 48 and 49 of the two bell crank members 40 and 41, respectively, extend toward each other with each being provided with an elongated slot 50 and 51, respectively. The arm portion 49 of the bell crank member 41 together with the rear end portion of its associated cutter blade 47 is offset upwardly whereby to permit it to overlie the other arm portion 48 of the bell crank member 40 with the slot 51 therein extending across the slot 50 in the arm portion 48. The lower end of the drive pin 27 extends downwardly through both the slot 51 in the offset arm portion 49 of the member 41 and through the slot 50 in the underlying arm portion 48 of the member 40. Upon rotation of the eccentrically mounted drive pin 27 during operation of the motor, the pair of bell crank members 40 and 41 are pivotably oscillated simultaneously toward and away from each other about the pins 42 and 43, respectively, through the driving engagement of the lower end of the drive pin 27 in the elongated slots 50 and 51 in a manner well known in the art. During one complete revolution of the drive pin 27, the pair of cutter blades 46 and 47 are pivoted inwardly toward each other from the positions illustrated in FIG. 2 in which they overlie the outermost finger-like teeth 35 on the stationary blade member 30 to their innermost positions illustrated in FIG. 3 in which they overlie the centermost finger-like tooth member 35 and back again to their furthest apart positions of FIG. 2. The side edges of the outer end portions of the oscillating cutter blades 46 and 47 are provided with sharpened edges 54, which edges 54 co-operate with the sharpened edges 36 on the stationary teeth 35, during oscillating movement of the cutter blades 46 and 47 relative to the stationary blade member 30, to cut grass and the like extending between the stationary teeth 35 with a shear-like action in a manner well known in the art.

The present invention is primarily concerned with improvements in a grass and shrub shear of the character described, which improvements serve to substantially improve the shear-like cutting action of the shear 10 and to render the shear 10 both self-sharpening and self-cleaning. To substantially improve the shear-like cutting action of the shear 10 and render the shear 10 self-sharpening, the forward end portions 69 of the spring steel cutter blades 46 and 47 are provided with a downward deflection toward the stationary teeth 35 of the blade member 30, as best illustrated in FIG. 6, which deflection is in the order of 1/16" at the tips of the cutter blades 46 and 47.

To provide cutting tension between the downwardly deflected end portions 69 of the cutter blades 46 and 47 and the stationary teeth 35 of the blade member 30, a pressure plate 56 which overlies the rear portions of the bell crank members 40 and 41 is secured to the stationary blade member 30 by the threaded fasteners 31. As is best illustrated in FIG. 5, each fastener 31 is threadedly received in a sleeve member 58 which is fitted in vertically aligned bores formed in the pressure plate 56 and the stationary blade member 30 and which is provided with an enlarged head portion 59 which is engageable with the upper surface of the pressure plate 56. A washer-like spacer 60 is fitted on each sleeve member 58 intermediate the pressure plate 56 and the stationary blade member 30.

The forward edge 62 of the pressure plate 56, which is arcuately curved, is downwardly offset into abutting engagement with the upper surfaces of the members 40 and 41 approximately midway between the forward and rear end portions thereof whereby to provide the cutting tension between the oscillating cutter blades 46 and 47 and the finger-like teeth 35 of the stationary blade member 30 and thereby the substantially improved shear-like cutting action of the shear 10.

The pressure plate 56 is provided with an opening 64 (FIG. 1) which serves to accommodate the rotational movement of the enlarged portion 33 of the drive pin 27 during actuation of the motor. A gasket 66, which is seated in a downwardly opening groove 67 formed in the portion of the front wall of the housing 11 defining the upper edge of the front opening 38, extends downwardly into sealing engagement with the upper surface of the pressure plate 56 and serves as a closure for the portion of the opening 38 in the front wall of the housing 11 above the pressure plate 56 whereby to prevent grass and the like cut by the shear 10 from entering the interior of the housing 11 where such material might jam the drive mechanism.

With the pressure plate 56 providing a cutting tension between the downwardly deflected end portions 69 of the cutter blades 46 and 47 and the stationary teeth 35 on the blade member 30, a substantially improved shear-like cutting action is provided. This cutting tension also serves to render the shear 10 self-sharpening as the cutting edges 36 of the teeth 35 and the cutting edges 54 of the cutter blades 46 and 47 begin to wear.

Normally, when the cutting blades 46 and 47 are pivoted toward each other from their outermost positions, as shown in FIG. 2, during a grass cutting operation, for example, some of the cut grass is swept inwardly and rearwardly by the cutter blades 46 and 47 in a manner such that some of the cut grass passes beneath the pressure plate 56 and into the interior of the housing 11 where it tends to jam the drive mechanism. To prevent such an occurrence, a generally rectangular self-cleaning opening 72 is formed in the stationary blade member 30 rearwardly of the finger-like teeth 35 and approximately midway between the side edges of the blade member 30. Thus, when grass or other material cut by the shear 10 is swept inwardly and rearwardly on the blade member 30 during inward movement of the cutter blades 46 and 47, such material is sweep toward the self-cleaning opening 72 through which it falls before it can enter the interior of the housing 11 whereby to render the shear 10 self-cleaning. Inasmuch as the material cut by the shear 10 falls through the self-cleaning opening 72 before it can enter the interior of the housing 11, clogging or jamming of the drive mechanism due to an undesirable collection of such cut material within the housing 11 is substantially eliminated.

In operation, when the motor is energized, the cutter blades 46 and 47 are oscillated toward and away from each other in shearing relation to the teeth 35 on the stationary blade member 30 through the driving engagement of the slotted portions 50 and 51 thereof with the eccentrically rotatable driving pin 27. The cutting tension provided between the downwardly deflected end portions 69 of the cutter blades 46 and 47 and the stationary teeth 35 of the blade member 30 by the pressure plate 56 results in a substantially improved shear-like cutting action. As described herein, the opening 72 formed in the plate member 30 serves to render the shear 10 self-cleaning inasmuch as the cut material that is normally swept toward the interior of the housing 11 by the cutter blades 46 and 47 as they are pivoted toward each other is directed toward the opening 72 through which it falls away from the shear 10.

It is noted that the bevel gear 23 of the drive mechanism illustrated may be replaced by a known-type spring-clutch drive arrangement which is adapted to uniformly distribute among the teeth of the gears of the drive mechanism shock forces imparted thereto as a result of sudden stops of the oscillating cutter blades 46 and 47, as at the opposite ends of their strokes where their directions of movement are reversed and as a result of external jamming forces, for instance, large twigs, wires, stones and the like which might be caught between the cutter blades 46 and 47 and the stationary teeth 35, whereby to equalize the wear of the gear members of the drive mechanism and thereby increase the effective life thereof.

It will be understood that certain changes may be made in the construction or arrangement of the improved grass and shrub shear disclosed herein without departing from the spirit and scope of the invention as defined in the appended claims.

I claim:

1. In a hand-operable electric shrub and garden shear having a housing, an electric motor in the housing, a fixed blade member extending forwardly of the housing and having a series of spaced finger-like teeth members projecting forwardly therefrom and having sharpened side edges, a pair of bell crank members each pivotally mounted intermediate its two arm portions on the rear portion of the fixed blade member with one arm portion of each defining a forwardly projecting cutter blade having sharpened side edges, which cutter blades are generally co-planar and are adapted in one position to overlie in sliding engagement with the two outermost finger-like teeth members of the fixed blade member, and pin-and-slot means interconnecting the ends of the other arm portions of the bell crank members and the drive shaft of the motor in a manner whereby during actuation of the motor the two cutter blades are simultaneously pivotally oscillated toward and away from each other relative to the finger-like teeth members of the fixed blade member to provide a shear-like cutting action, the improvement which comprises, the forward end portions of the oscillating cutter blades which overlie the finger-like teeth members of the fixed blade member being provided with a downward deflection in the order of 1/16" whereby to increase the shearing action and render the shear self-sharpening, and a pressure plate overlying the rear portions of the pair of oscillating cutter blades whereby to prevent upward movement thereof away from the finger-like teeth members of the fixed blade member.

2. In a device having a fixed blade provided with spaced apart generally pointed teeth, a pair of generally pointed and generally co-planar cutting blades overlying the teeth of the fixed blade in sliding engagement therewith and mounted for pivotal movement about separate spaced apart axes of rotation, and drive means for pivotally oscillating the cutting blades toward and away from each other transversely of the teeth of the fixed blade to provide a shear-like cutting action, the improvement which comprises the fixed blade being provided inwardly of the pointed teeth with an opening through which the material cut may fall, said opening being located approximately midway between the pair of cutting blades when such blades have reached the ends of their paths of movement toward each other whereby said opening renders the device self-cleaning.

3. In a hand-operable electric shrub and garden shear having a housing, an electric motor in the housing, a fixed blade member extending forwardly of the housing and having a series of spaced finger-like teeth members projecting forwardly therefrom, a pair of bell crank members each pivotally mounted intermediate its two arm portions on the rear portion of the fixed blade member with one arm portion of each defining a forwardly projecting cutter blade, which cutter blades are generally co-planar and are adapted in one position to overlie in sliding engagement with the two outermost finger-like teeth members of the fixed blade member, and pin-and-slot means interconnecting the ends of the other arm portions of the bell crank members and the drive shaft of the motor in a manner whereby during actuation of the motor the two cutter blades are simultaneously pivotally oscillated toward and away from each other relative to the finger-like teeth members of the fixed blade member to provide a shear-like cutting action, the improvement which comprises, means defining an opening in the fixed blade member through which the material cut may fall whereby to render the shear self-cleaning, said opening being located slightly rearwardly of the finger-like teeth members of the fixed blade member and approximately midway between the oscillating cutting blades whereby said oscillating cutting blades serve to sweep the material cut toward said opening when they are pivoted toward each other from said one position wherein they overlie the two outermost finger-like teeth members.

4. In a device having a fixed blade provided with spaced apart generally pointed teeth, a pair of generally pointed and generally co-planar cutting blades overlying the teeth of the fixed blade in sliding engagement therewith and mounted for pivotal movement about separate spaced apart axes of rotation, and drive means for pivotally oscillating the cutting blades toward and away from each other transversely of the teeth of the fixed blade to provide a shear-like cutting action, the improvement which comprises the outer ends of said oscillating cutting blades being provided with a deflection toward the fixed blade whereby to substantially improve the shearing action and render the device self-sharpening, and the fixed blade being provided inwardly of the pointed teeth with an opening through which the material cut may fall, said opening being located approximately midway between the pair of cutting blades when such blades have reached the ends of their paths of movement toward each other whereby said opening renders the device self-cleaning.

5. In a device having a fixed blade provided with spaced apart generally pointed teeth, a pair of generally pointed cutting blades overlying the teeth of the fixed blade in sliding engagement therewith, and drive means for oscillating the cutting blades toward and away from each other transversely of the teeth of the fixed blade to provide a shear-like cutting action, the improvement which comprises the outer ends of said oscillating cutting blades being provided with a deflection toward the fixed blade whereby to substantially improve the shearing action and render the device self-sharpening, a pressure plate overlying the opposite end portions of said generally pointed cutting blades for retaining said blades in sliding engagement with said fixed blade, and an opening formed in the fixed blade through which the material cut may fall, said opening being located inwardly of said pointed teeth and approximately midway between the pair of cutting blades when such blades have reached the ends of their paths of movement toward each other whereby the material cut is adapted to be swept toward said opening by said pair of blades to render the device self-cleaning.

6. In a hand-operable electric shrub and garden shear having a housing, an electric motor in the housing, a fixed blade member extending forwardly of the housing and having a series of spaced finger-like teeth members projecting forwardly therefrom, a pair of bell crank members each pivotally mounted intermediate its two arm portions on the rear portion of the fixed blade member with one arm portion of each defining a forwardly projecting cutter blade, which cutter blades are adapted in one position to overlie in sliding engagement with the two outermost finger-like teeth members of the fixed blade member, and pin-and-slot means interconnecting the ends of the other arm portions of the bellcrank members and the drive shaft of the motor in a manner whereby during actuation of the motor the two cutter blades are simultaneously pivotally oscillated toward and away from each other relative to the finger-like teeth members of the fixed blade member to provide a shear-like cutting action, the improvement which comprises, the forward end portions of the oscillating cutter blades which overlie the finger-like teeth members of the fixed blade member being provided with a downward deflection in the order of $\frac{1}{16}''$ whereby to increase the shearing action and render the shear self-sharpening, a pressure plate overlying the rear portions of the pair of oscillating cutter blades whereby to prevent upward movement thereof away from the finger-like teeth members of the fixed blade member, and means defining an opening in the fixed blade member rearwardly of said finger-like teeth members through which the material cut may fall whereby to render the shear self-cleaning, said opening being located slightly rearwardly of the finger-like teeth members of the fixed blade member and approximately midway between the oscillating cutting blades whereby the latter serve to sweep the material cut toward said opening when they are pivoted toward each other from said one position wherein they overlie the two outermost finger-like teeth members.

7. A shrub and garden shear comprising, in combination, a fixed blade member having a plurality of finger-like teeth with sharpened side edges, a pair of cutting blades having generally co-planar pointed ends with sharpened side edges overlying the teeth of said fixed blade member in sliding engagement therewith, means mounting the opposite ends of said cutting blades on said fixed blade member inwardly of said teeth for pivoting movement about separate spaced apart axes of rotation, and drive means for simultaneously oscillating said pair of cutting blades toward and away from each other generally transversely of said teeth of said fixed blade member between widely spaced apart and closely adjacent but non-abutting positions whereby to provide a shear-like cutting action, said pointed end of each of said pair of cutting blades being provided with a deflection toward said fixed blade member whereby to substantially improve the shearing action and render the shear self-sharpening.

References Cited in the file of this patent

UNITED STATES PATENTS

| | | |
|---|---|---|
| 1,005,287 | Ogden | Oct. 10, 1911 |
| 1,387,604 | Mendal | Aug. 16, 1921 |
| 2,331,319 | Hardy | Oct. 12, 1943 |
| 2,641,833 | Need | June 16, 1953 |
| 2,751,680 | Wezel | June 26, 1956 |